(12) United States Patent
Wendorf et al.

(10) Patent No.: US 7,130,267 B1
(45) Date of Patent: Oct. 31, 2006

(54) SYSTEM AND METHOD FOR ALLOCATING BANDWIDTH IN A NETWORK NODE

(75) Inventors: Kent Wendorf, San Jose, CA (US); Thinh Hau, Los Altos, CA (US); Hariprasad R. Ginjpalli, Cupertino, CA (US); Jose C. Shen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 999 days.

(21) Appl. No.: 09/751,792

(22) Filed: Dec. 29, 2000

(51) Int. Cl.
*H04J 1/16* (2006.01)
*H04L 12/28* (2006.01)

(52) U.S. Cl. .............. 370/230.1; 370/395.4; 370/412

(58) Field of Classification Search .......... 370/230, 370/235, 236, 236.1, 236.2, 252, 389, 351–3, 370/395.1, 395.2, 395.21, 395.4, 395.41, 370/395.43, 229, 232, 412, 230.1
See application file for complete search history.

(56) References Cited

U.S. PATENT DOCUMENTS

| | | | |
|---|---|---|---|
| 5,224,099 A | | 6/1993 | Corbalis et al. |
| 5,313,454 A | | 5/1994 | Bustini et al. |
| 5,359,592 A | | 10/1994 | Heitkamp et al. |
| 5,436,891 A | | 7/1995 | Grossman et al. |
| 5,533,020 A | * | 7/1996 | Byrn et al. ............ 370/395.4 |
| 5,835,494 A | | 11/1998 | Hughes et al. |
| 5,838,915 A | | 11/1998 | Klausmeier et al. |
| 6,002,667 A | | 12/1999 | Manning et al. |
| 6,011,798 A | * | 1/2000 | McAlpine .............. 370/395.42 |
| 6,034,945 A | | 3/2000 | Hughes et al. |
| 6,061,348 A | | 5/2000 | Castrigno et al. |
| 6,067,298 A | * | 5/2000 | Shinohara ............ 370/395.71 |
| 6,088,736 A | | 7/2000 | Manning et al. |
| 6,208,661 B1 | * | 3/2001 | Marshall ..................... 370/412 |
| 6,324,165 B1 | * | 11/2001 | Fan et al. .................... 370/232 |
| 6,359,891 B1 | * | 3/2002 | Bergantino et al. ......... 370/398 |
| 6,408,005 B1 | | 6/2002 | Fan et al. |
| 6,424,624 B1 | | 7/2002 | Galand et al. |
| 6,430,191 B1 | * | 8/2002 | Klausmeier et al. ........ 370/412 |
| 6,445,707 B1 | | 9/2002 | Iuoras et al. |
| 6,512,743 B1 | | 1/2003 | Fang |
| 6,526,060 B1 | | 2/2003 | Hughes et al. |

(Continued)

OTHER PUBLICATIONS

Stallings, ISDN and Broadband ISDN with Frame Relay and ATM, 1999, Prentice-Hall, Inc., pp. 460-465.*

(Continued)

*Primary Examiner*—Huy D. Vu
*Assistant Examiner*—Nittaya Juntima
(74) *Attorney, Agent, or Firm*—Blakely, Sokoloff, Taylor & Zafman LLP (57) ABSTRACT

A system and method for allocating bandwidth in a network node are described. Multiple data units are received along a plurality of virtual connections in a network, each virtual connection having a predetermined unit rate. The data units are subsequently stored. Finally, a data unit of the stored data units having a data unit rate higher than the predetermined unit rate of each virtual connection is transmitted at predetermined time intervals.

48 Claims, 6 Drawing Sheets

U.S. PATENT DOCUMENTS

| | | |
|---|---|---|
| 6,526,062 B1 | 2/2003 | Milliken et al. |
| 6,535,484 B1 | 3/2003 | Hughes et al. |
| 6,654,374 B1 | 11/2003 | Fawaz et al. |
| 6,657,962 B1 | 12/2003 | Barri et al. |
| 6,661,802 B1 | 12/2003 | Homberg et al. |
| 6,714,517 B1 | 3/2004 | Fawaz et al. |
| 6,810,012 B1 * | 10/2004 | Yin et al. ................ 370/230.1 |
| 6,947,380 B1 * | 9/2005 | Yip et al. ................... 370/230 |
| 2003/0133406 A1 | 7/2003 | Fawaz et al. |

OTHER PUBLICATIONS

Stallings, High-Speed Networks TCP/IP and ATM Design Principals, 1998, Prentice-Hall, Inc., 359-362.*

* cited by examiner

SYSTEM AND METHOD FOR ALLOCATING BANDWIDTH IN A NETWORK NODE

FIELD OF THE INVENTION

The present invention relates generally to telecommunications systems and, more particularly, to a system and method for allocating bandwidth in a network node.

BACKGROUND OF THE INVENTION

An Asynchronous Transfer Mode (ATM) is a switching and multiplexing technique designed for transmitting digital information, such as data, video, and voice, at high speed, with low delay, over a telecommunications network. The telecommunications network, for example an ATM network, includes a number of switching nodes coupled through communication links. In the ATM network, bandwidth capacity is allocated to fixed-sized data units named "cells." The communication links transport the cells from a switching node to another. These communication links can support many virtual connections, also named channels, between the switching nodes. The virtual connections assure the flow and delivery of information contained in the cells.

Each cell contains a cell header and cell data. The cell header includes information necessary to identify the destination of that cell. The components of the cell header include, among other things, a Virtual Channel Identifier (VCI) and a Virtual Path Identifier (VPI), for collectively identifying an ATM connection for that particular cell, and a Payload Type Identifier (PTI), for indicating whether the cell is sent from one user to another, whether cell data refers to administration or management traffic, and whether congestion is present within the network.

The ATM Forum, which is a user and vendor group establishing ATM standards, has also defined several ATM class of service categories, used in characterization of a virtual connection, for example, (1) a Constant Bit Rate (CBR), which supports a constant or guaranteed rate to transport services, such as video or voice, as well as circuit emulation, which requires rigorous timing control and performance parameters; (2) a Variable Bit Rate (VBR), real time and non real time, which supports variable bit rate data traffic with average and peak traffic parameters; (3) an Available Bit Rate (ABR), which supports feedback to control the source rate in response to changed characteristics in the network; and (4) an Unspecified Bit Rate (UBR).

SUMMARY OF THE INVENTION

A system and method for allocating bandwidth in a network node are described. Multiple data units are received along a plurality of virtual connections in a network, each virtual connection having a predetermined unit rate. The data units are subsequently stored. Finally, a data unit of the stored data units having a data unit rate higher than the predetermined unit rate of each virtual connection is transmitted at predetermined time intervals.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a system and method for allocating bandwidth in a network node are described. The following discussion is presented in the context of an Asynchronous Transfer Mode (ATM) network. It should be understood that the present invention is not limited to ATM networks and may be implemented with other types of networks.

Figure 1:
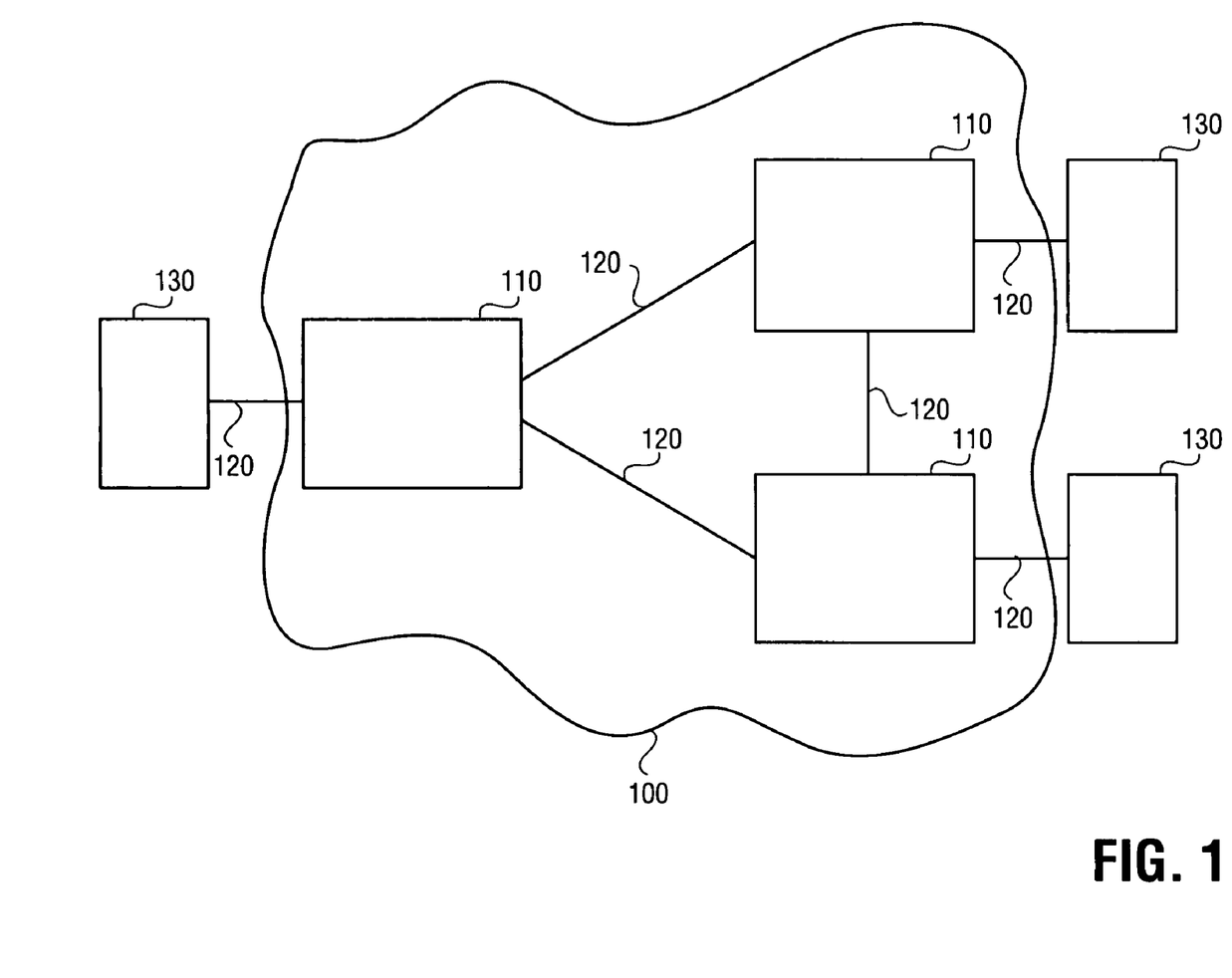
FIG. 1 is a block diagram of one embodiment of a network.

FIG. 1 is a block diagram of a network. As illustrated in FIG. 1, in one embodiment, network 100 includes several network nodes 110 connected through single communication links 120. In one embodiment, network 100 is a data transmission network with guaranteed bandwidth and quality of service, for example an Asynchronous Transfer Mode (ATM) network.

In one embodiment, network nodes 110 are located in the middle of the network 100. Alternatively, nodes 110 may also be located at the edges of the network 100. Users 130 access the network 100 and connect to the network nodes 110 via similar communication links 120. In one embodiment, the illustrated communication links 120 support multiple virtual connections.

Figure 2:
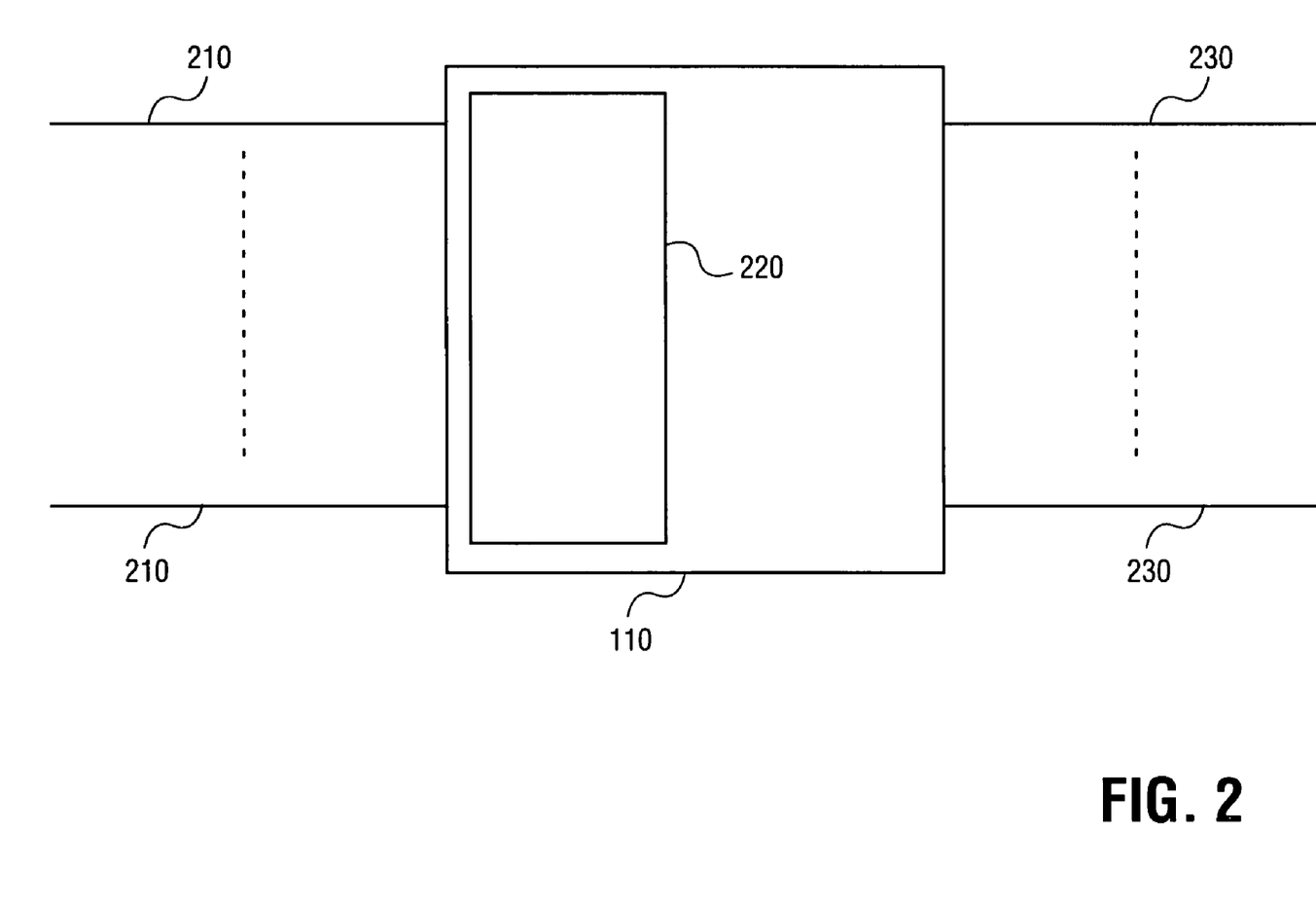
FIG. 2 is a block diagram of one embodiment of a network node within the network.

FIG. 2 is a block diagram of a network node within network 100. As illustrated in FIG. 2, in one embodiment, network node 110, for example an ATM switching node, receives information, such as data, along multiple input virtual connections 210 within communication link 120. In one embodiment, only two virtual connections 210 are illustrated. Alternatively, several virtual connections 210 may transport information to the switching node 110. In one embodiment, the information transmitted along virtual connections 210 is incorporated in communication cells. In one embodiment, the cells used to transmit information are data cells. Alternatively, transmitted cells may include other types of cells, for example control cells.

In one embodiment, switching node 110 receives data along input virtual connections 210 and transfers data to a line card 220 described in detail below. Line card 220 is further coupled to multiple output virtual connections 230 and facilitates transmission of data along the output virtual connections 230 to a destination node 110. In one embodiment, two output virtual connections 230 are illustrated. Alternatively, multiple output virtual connections 230 may transmit cells to destination node 110.

Figure 3:
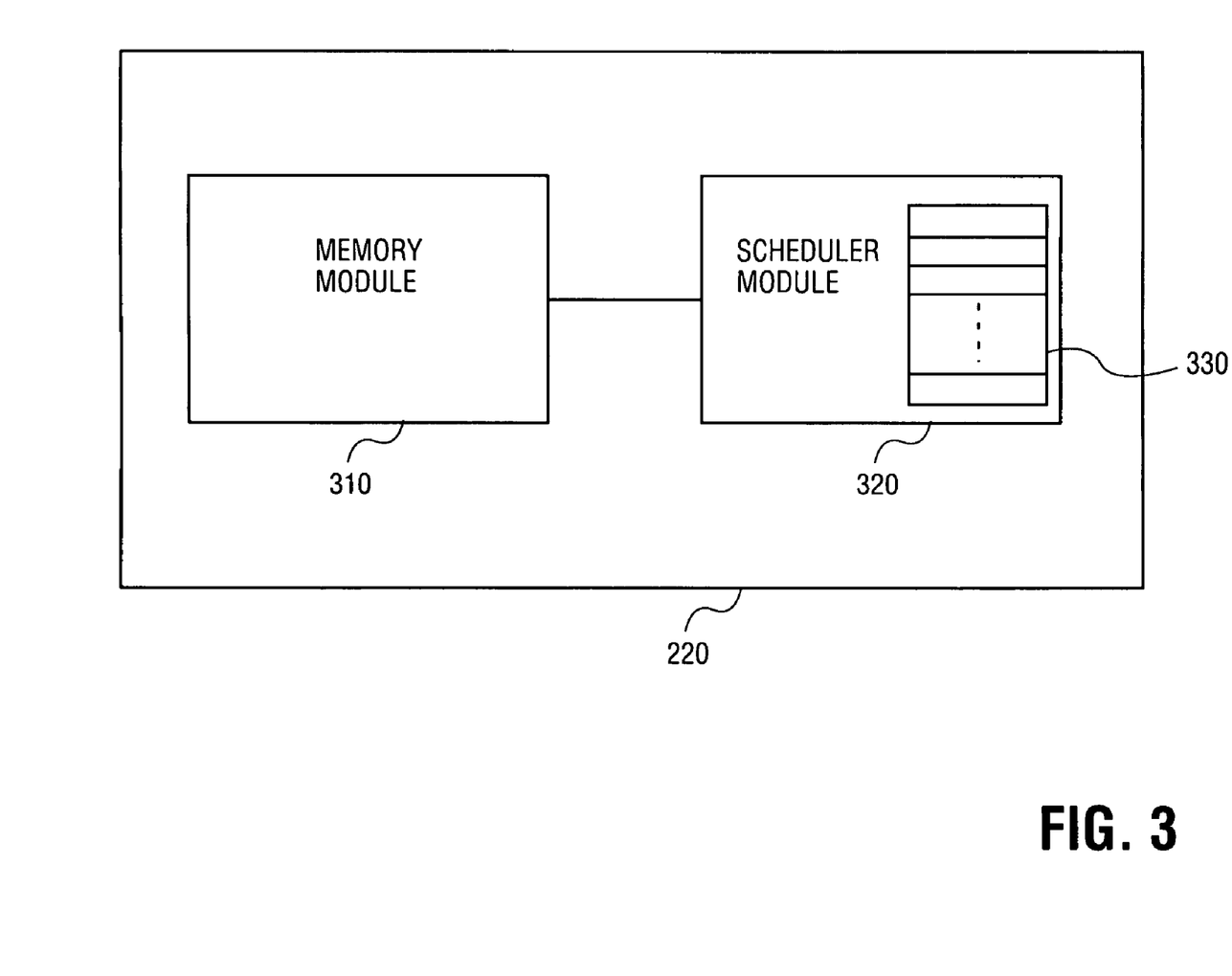
FIG. 3 is a block diagram of one embodiment of a line card within the network node.

FIG. 3 is a block diagram of a line card within network node 110. As illustrated in FIG. 3, in one embodiment, line card 220 includes a memory module 310 and a scheduler module 320, coupled to the memory module 310. In one embodiment, the memory module 310 stores cells received along the multiple virtual connections 120.

In one embodiment, the scheduler module 320 monitors transmission of data and selects stored cells to be transmitted along the output virtual connections 230. As further illustrated in FIG. 3, in one embodiment, scheduler module 310 includes a table 330 for storing a predetermined cell rate of each input virtual connection 210 and for ordering the input virtual connections 210 in descending order based on their corresponding cell rate. In one embodiment, the cell rate of the fastest input virtual connection 210 is stored in a first position within the table 330. The memory module 310 and the scheduler module 320 will be described in further detail below.

Figure 4:
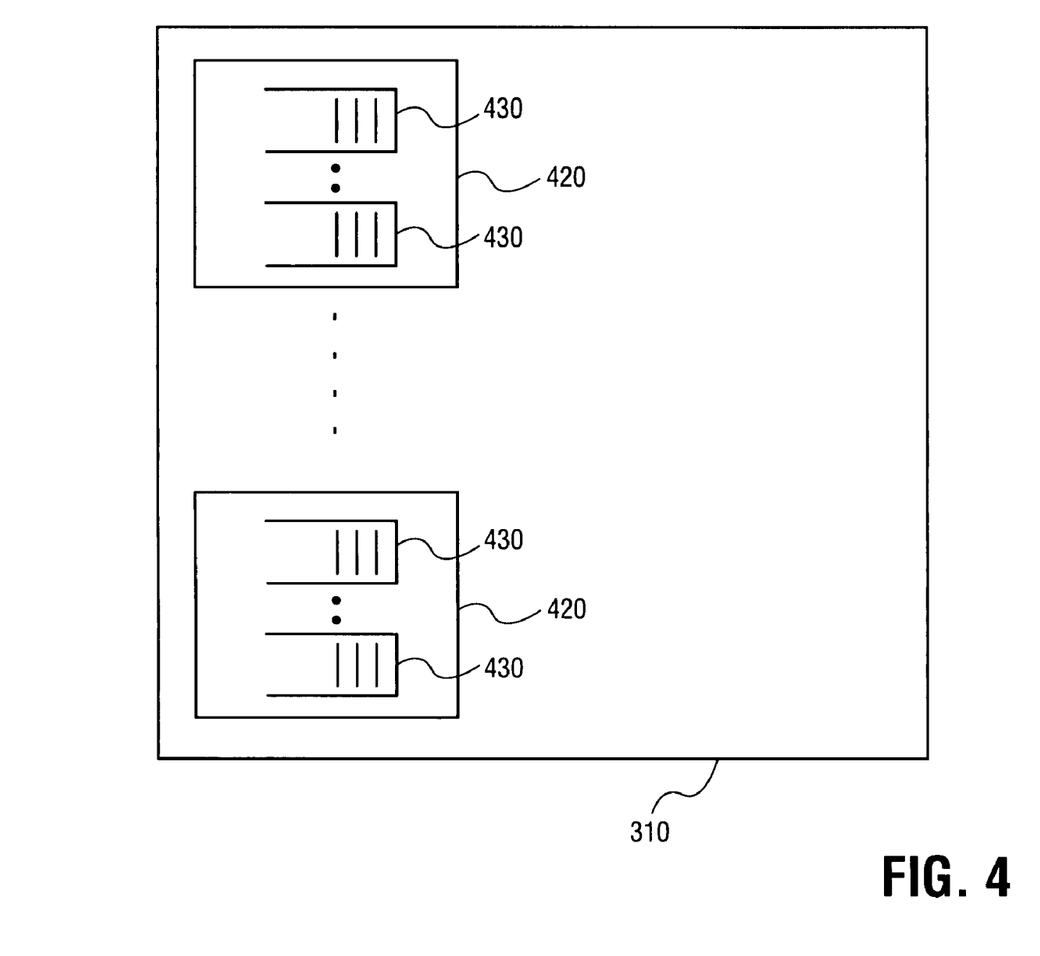
FIG. 4 is a block diagram of one embodiment of a memory module within the line card.

FIG. 4 is a block diagram of a memory module within the line card 220. As illustrated in FIG. 4, in one embodiment, memory module 310 includes multiple service groups 420 containing buffers 430 for storing the cells transmitted along the input virtual connections 210. Each buffer 430 within each service group 420 corresponds to one ATM class of service category used in the characterization of each virtual connection 210, for example CBR, VBR, ABR, or UBR.

Cells arriving along input virtual connections 210 into the network node 110 are identified based on their respective ATM header, which includes the VPI and VCI. In one embodiment, each cell is classified based on its corresponding ATM header and a corresponding service group 420 is determined. The cell is then stored in a buffer 430 corresponding to the determined service group and class of service category.

In one embodiment, scheduler module 320 selects service groups 420 and buffers 430 and retrieves cells according to predetermined maximum service rates for each service group. The service rates are programmed with an Inter Cell Gap (ICG) parameter, which specifies the minimum time gap between successive departures of cells.

In order to transmit the stored cells along the output virtual connections 230, service groups 420 must be selected and cells must depart from the service groups at scheduled times. The scheduling of service groups 420 uses a Theoretical Departure Time (TDT) variable parameter attached to each service group 420. The TDT parameters for service groups 420 are fixed in a time scale and spaced by their corresponding ICG. The scheduler module 320 uses the ICG to calculate the next TDT parameter of each service group 420 for a future selection. If the TDT parameter of a service group 420 is less than or equal to a current time counter on the time scale, then the service group 420 is eligible to release cells to be transmitted on an output virtual connection 230.

The scheduler module 320 also monitors the number of cells available within each service group 420. With each arrival of cells, a cell counter for each service group 420 is incremented. With each selection of a service group 420, after cells depart the service group, the cell counter is decremented. If the TDT parameter for a service group 420 is less than or equal to the current time counter, cells may depart the selected service group 420, provided that the corresponding cell counter is not zero, showing an empty service group 420.

At a predetermined selection time, more than one service groups may be eligible and thus contending for selection of a service group. In one embodiment, the scheduler module 320 selects the service group 420 having the lowest TDT parameter on the time scale among all the eligible service groups. However, in this approach, fast service groups could loose bandwidth while slow service groups, having TDT parameters far behind the current time counter, are serviced consecutively.

In one embodiment, the scheduler module 320 selects one service group from the eligible service groups 420 based on the cell rate of the corresponding input virtual connection 210. Scheduler module 320 selects the service group 420 based on the highest cell rate in the table 330. In a line card 220, the fastest input virtual connection 210 is serviced first among the eligible ones and, thus, the slower virtual connections 210 are subsequently serviced in descending order of their cell rate.

In one embodiment, cells must depart from buffers 430 at scheduled times. The scheduling of buffers 430 within the selected service group 420 uses a Theoretical Departure Time (TDT) variable buffer parameter attached to each buffer 430 within the corresponding service group 420. The TDT variable buffer parameters for the buffers 430 are fixed in a time scale and spaced by their corresponding ICG. The scheduler module 320 uses the ICG to calculate the next TDT buffer parameter value of the buffer 430 for a future selection. If the TDT parameter of a buffer 430 is less than or equal to a current time counter on the time scale, then that buffer 430 is not meeting its minimum bandwidth requirements and becomes eligible to release cells to be transmitted on an output virtual connection 230.

The scheduler module 320 also monitors the number of cells available within each buffer 430. With each arrival of cells, a cell counter within the buffer 430 is incremented. With each selection of a buffer 430, after cells depart the selected buffer, the cell counter of the buffer 430 is decremented. If the TDT buffer parameter is less than or equal to the current time counter, cells may depart the selected buffer 430, provided that the corresponding cell count is not zero, showing an empty buffer 430.

At a predetermined selection time, more than one buffers 430 may be eligible and thus contending for selection.

In one embodiment, the scheduler module 320 selects the buffer 430 having the lowest TDT buffer parameter on the time scale to be serviced first. The remaining buffers 430 are subsequently serviced based on their corresponding TDT buffer parameters. In this embodiment, after the buffer 430 is selected, its corresponding TDT buffer parameter is updated with its specific ICG in preparation for the next selection of a buffer 430 to be serviced.

If the selected buffer 430 releases a cell, and has no stored cells to be transmitted, then it becomes inactive for a period of time. If a buffer is inactive for a period of time, its corresponding TDT buffer parameter will fall behind the current time counter. In one embodiment, after each subsequent selection of a buffer 430, the TDT buffer parameter of an empty buffer 430 is updated and receives the value of the current time. However, other eligible active buffers may have TDT buffer parameters lower than the current time counter, and, as a result, will be subsequently eligible to be selected to release cells. Therefore, the empty buffer having the TDT buffer parameter equal to the current time will suffer a severe service delay lag time when it becomes active again, because it will have to wait for all active buffers having TDT buffer parameters lower than the current time counter to be serviced first.

In one embodiment, the scheduler module 320 updates the corresponding TDT buffer parameter of an empty buffer 430 while the buffer is inactive. In order to avoid a service delay for this empty buffer 430, when the buffer becomes active and receives cells, after a subsequent active buffer 430 is selected and cells are scheduled to depart, if the TDT buffer parameter of the empty buffer 430 is lower than the TDT buffer parameter of the selected buffer, then the TDT buffer parameter of the empty buffer is updated with the TDT parameter value of the selected buffer. Simultaneously, the TDT buffer parameter of the selected buffer is updated with its corresponding ICG. This method allows the empty buffer to compete for selection with all eligible active buffers, at the time the empty buffer becomes active again.

Otherwise, in an alternate embodiment, if the TDT buffer parameter of the empty buffer is greater than the TDT buffer parameter of the selected buffer, then no further update is performed.

Figure 5:
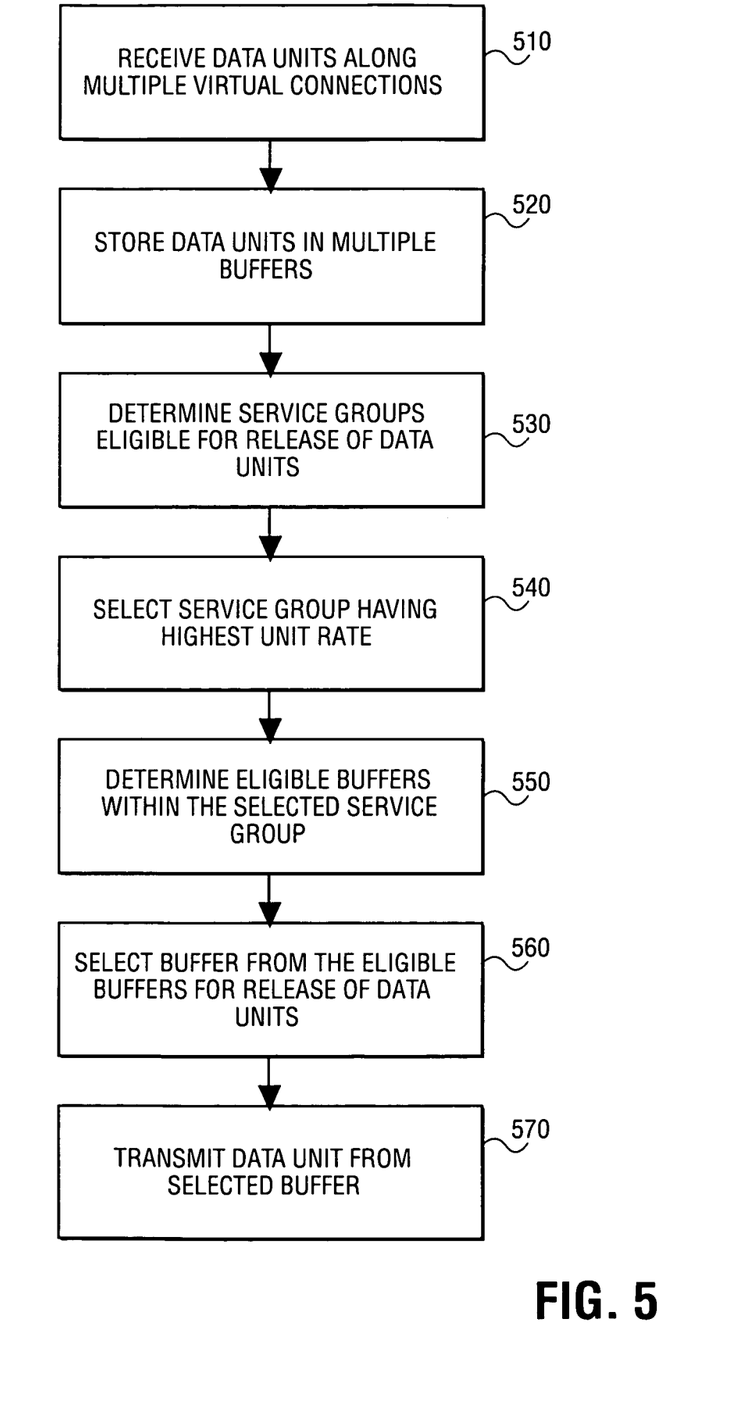
FIG. 5 is a flow diagram of one embodiment of a method for allocating bandwidth in a network node.

FIG. 5 is a flow diagram of one embodiment of a method for allocating bandwidth in a network node. According to FIG. 5, at processing block 510, data units, for example cells, are received along multiple input virtual connections in a network, each input virtual connection having a predetermined unit rate, for example a predetermined transmission cell rate.

At processing block 520, the data units received are stored in multiple buffers within a memory module. In one embodiment, cells are classified based on their respective ATM header and stored in buffers corresponding to the predetermined cell rate of the input virtual connection along which each cell was transmitted. In one embodiment, the transmission cell rate of each virtual connection is stored in a table and each virtual connection is ordered in descending order based on its respective cell rate.

At processing block 530, service groups eligible for release of data units are determined. In one embodiment, the determination of eligible service groups uses a TDT parameter attached to each service group. If the TDT parameter of a specific service group is lower than or equal to a current time counter on the time scale, then that service group is eligible to release data units.

At processing block 540, a service group having the highest unit rate is selected. In one embodiment, one service group is selected from all eligible service groups based on the cell rate of the virtual connections. The service group corresponding to the virtual connection having the highest cell rate is selected.

At processing block 550, buffers eligible to release data units are determined within the selected service group. At processing block 560, a buffer storing data units or cells to be transmitted is selected among the eligible buffers within the selected service group.

At processing block 570, a data unit from the selected buffer is transmitted along an output virtual connection. In one embodiment, the selected buffer within the service group corresponding to the fastest input virtual connection is serviced first and its TDT buffer parameter is then updated for the next selection.

Figure 6:
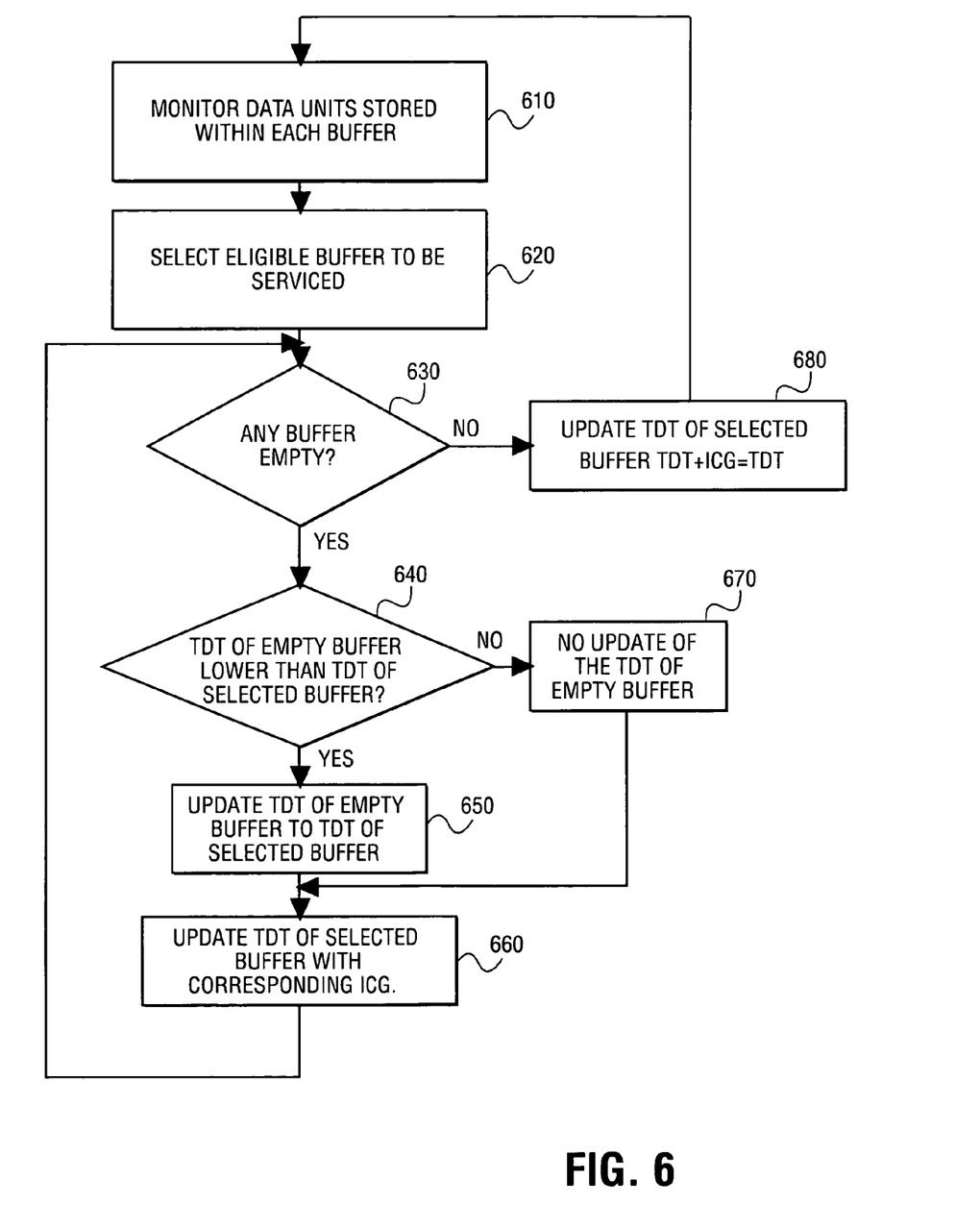
FIG. 6 is a flow diagram of one embodiment of a method for reducing the delay in transmission of data in a network node.

FIG. 6 is a flow diagram of one embodiment of a method for reducing the delay in transmission of data in a network node. According to FIG. 6, at processing block 610, each buffer and its stored data units or cells are monitored.

At processing block 620, a buffer eligible to be serviced is selected. In one embodiment, selected eligible buffers release cells and become inactive if they run out of stored cells to transmit.

At processing block 630, a decision is made whether any one of the buffers is empty and does not have any stored cells. If an empty buffer exists, at processing block 640, a decision is made whether the TDT parameter of the empty buffer is lower than the TDT parameter of the selected buffer to be serviced. If the TDT parameter of the empty buffer is lower than the TDT parameter of the selected buffer, then the TDT parameter of the empty buffer is updated with the TDT parameter value of the selected buffer at processing block 650. Subsequently, at processing block 660, the TDT parameter of the selected buffer is updated with the value of the Inter Cell Gap (ICG) to a value TDT'=TDT+ICG on the time scale and processing blocks 630 through 660 are repeated.

Otherwise, if the TDT parameter of the empty buffer is greater than the TDT parameter of the selected buffer, at processing block 670, no update of the TDT parameter of the empty buffer is necessary and the procedure continues with processing block 660.

If no empty buffers exist, at processing block 680, the TDT parameter of the selected buffer is updated with the value of the Inter Cell Gap (ICG) to a value TDT'=TDT+ ICG on the time scale and processing blocks 610 through 630 are repeated.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    receiving a plurality of data units along a plurality of virtual connections in a network, each virtual connection of said plurality of virtual connections having a predetermined unit rate;
    storing each of said plurality of data units in one of a plurality of class of service buffers, the one of the plurality of class of service buffers being selected by the predetermined unit rate of the virtual connection on which the data unit was received;
    attaching a Theoretical Departure Time (TDT) variable buffer parameter to each one of the plurality of class of service buffers;
    determining a group of eligible buffers from the plurality of class of service buffers, the eligible buffers having a TDT that is not later than a current time;
    selecting a selected buffer from the eligible buffers, the selected buffer having a highest predetermined unit rate of the eligible buffers; and
    transmitting a data unit from the selected buffer.

2. The method according to claim 1, wherein said network is an Asynchronous Transfer Mode Network.

3. The method according to claim 1, wherein said storing further comprises storing said predetermined unit rate of said each virtual connection in descending order.

4. The method according to claim 1, wherein said receiving further comprises receiving said plurality of data units in a line card including at least one service group interface having a plurality of classes of service.

5. The method according to claim 4, wherein said storing further comprises storing said plurality of data units in said plurality of class of service buffers within said at least one service group interface, each class of service buffer corresponding to one class of service of said plurality of classes of service.

6. The method according to claim 5, wherein said storing further comprises:
   selecting a service group interface from said at least one service group interface corresponding to one virtual connection of said plurality of virtual connections having said predetermined unit rate; and
   selecting one class of service buffer within said service group interface, said class of service buffer storing said data unit.

7. The method according to claim 6, wherein selecting a selected buffer further comprises determining each service group interface of said at least one service group interface having a TDT that is not later than the current time.

8. The method according to claim 6, wherein selecting the selected buffer further comprises determining each class of service buffer within said service group interface having a TDT that is not later than the current time.

9. The method according to claim 1, wherein said plurality of data units further comprises cells.

10. The method according to claim 1, further comprising:
    detecting an empty buffer of the plurality of class of service buffers; and
    updating an empty TDT corresponding to said empty buffer based on a TDT of the selected buffer.

11. The method according to claim 10, wherein said updating further comprises updating said empty TDT to said TDT of said selected buffer, if said empty TDT is lower than said TDT of said selected buffer.

12. The method according to claim 10, further comprising maintaining said empty TDT, if said empty TDT is higher than said TDT of said selected buffer.

13. A computer readable medium having stored thereon executable instructions which, when executed in a processing system, cause the system to perform a method comprising:
    receiving a plurality of data units along a plurality of virtual connections in a network, each virtual connection of said plurality of virtual connections having a predetermined unit rate;
    storing each of said plurality of data units in one of a plurality of class of service buffers, the one of the plurality of class of service buffers being selected by the predetermined unit rate of the virtual connection on which the data unit was received;
    attaching a Theoretical Departure Time (TDT) variable buffer parameter to each one of the plurality of class of service buffers;
    determining a group of eligible buffers from the plurality of class of service buffers, the eligible buffers having a TDT that is not later than a current time;
    selecting a selected buffer from the eligible buffers, the selected buffer having a highest predetermined unit rate of the eligible buffers; and
    transmitting a data unit from the selected buffer.

14. The computer readable medium according to claim 13, wherein said network is an Asynchronous Transfer Mode Network.

15. The computer readable medium according to claim 13, wherein said storing further comprises storing said predetermined unit rate of said each virtual connection in descending order.

16. The computer readable medium according to claim 13, wherein said receiving further comprises receiving said plurality of data units in a line card including at least one service group interface having a plurality of classes of service.

17. The computer readable medium according to claim 16, wherein said storing further comprises storing said plurality of data units in said plurality of class of service buffers within said at least one service group interface, each class of service buffer corresponding to one class of service of said plurality of classes of service.

18. The computer readable medium according to claim 17, wherein said storing further comprises:
    selecting a service group interface from said at least one service group interface corresponding to one virtual connection of said plurality of virtual connections having said predetermined unit rate; and
    selecting one class of service buffer within said service group interface, said class of service buffer storing said data unit.

19. The computer readable medium according to claim 18, wherein selecting a selected buffer further comprises determining each service group interface of said at least one service group interface having a TDT that is not later than the current time.

20. The computer readable medium according to claim 18, wherein selecting the selected buffer further comprises determining each class of service buffer within said service group interface having a TDT that is not later than the current time.

21. The computer readable medium according to claim 13, wherein said plurality of data units further comprises cells.

22. The computer readable medium according to claim 13, containing executable instructions further comprising:
    detecting an empty buffer of the plurality of class of service buffers; and
    updating an empty TDT corresponding to said empty buffer based on a TDT of the selected buffer.

23. The computer readable medium according to claim 22, wherein said updating further comprises updating said empty TDT to said TDT of said selected buffer, if said empty TDT is lower than said TDT of said selected buffer.

24. The computer readable medium according to claim 22, wherein the method further comprises maintaining said empty TDT, if said empty TDT is higher than said TDT of said selected buffer.

25. A system comprising:
    means for receiving a plurality of data units along a plurality of virtual connections in a network, each virtual connection of said plurality of virtual connections having a predetermined unit rate;
    means for storing each of said plurality of data units in one of a plurality of class of service buffers, the one of the plurality of class of service buffers being selected by the predetermined unit rate of the virtual connection on which the data unit was received;
    means for attaching a Theoretical Departure Time (TDT) variable buffer parameter to each one of the plurality of class of service buffers;
    means for determining a group of eligible buffers from the plurality of class of service buffers, the eligible buffers having a TDT that is not later than a current time;
    means for selecting a selected buffer from the eligible buffers, the selected buffer having a highest predetermined unit rate of the eligible buffers; and means for transmitting a data unit from the selected buffer.

26. The system according to claim 25, wherein said network is an Asynchronous Transfer Mode Network.

27. The system according to claim 25, further comprising means for storing said predetermined unit rate of said each virtual connection in descending order.

28. The system according to claim 25, further comprising means for receiving said plurality of data units in a line card including at least one service group interface having a plurality of classes of service.

29. The system according to claim 28, wherein said means for storing is further for storing said plurality of data units in said plurality of class of service buffers within said at least one service group interface, each class of service buffer corresponding to one class of service of said plurality of classes of service.

30. The system according to claim 29, further comprising:
means for selecting a service group interface from said at least one service group interface corresponding to one virtual connection of said plurality of virtual connections having said predetermined unit rate; and
means for selecting one class of service buffer within said service group interface, said class of service buffer storing said data unit.

31. The system according to claim 30, further comprising means for determining each service group interface of said at least one service group interface having a current time value.

32. The system according to claim 30, further comprising means for determining each class of service buffer within said service group interface having a departure time buffer parameter value lower than or equal to a TDT that is not later than the current time.

33. The system according to claim 25, further comprising:
means for detecting an empty buffer of the plurality of class of service buffers; and
means for updating an empty TDT corresponding to said empty buffer based on a TDT of the selected buffer.

34. The system according to claim 25, wherein said plurality of data units further comprises cells.

35. The system according to claim 33, further comprising means for updating said empty TDT to said TDT of said selected buffer, if said empty TDT is lower than said TDT of said selected buffer.

36. The system according to claim 33, further comprising means for maintaining said empty TDT if said empty TDT is higher than said TDT of said selected buffer.

37. A system comprising:
a memory module for receiving a plurality of data units along a plurality of virtual connections in a network, each virtual connection of said plurality of virtual connections having a predetermined unit rate;
a plurality of class of service buffers within the memory module for storing each of said plurality of data units in one of the plurality of class of service buffers, the one of the plurality of class of service buffers being selected by the predetermined unit rate of the virtual connection on which the data unit was received; and
a scheduler module coupled to said memory module for:
attaching a Theoretical Departure Time (TDT) variable buffer parameter to each one of the plurality of class of service buffers;
determining a group of eligible buffers from the plurality of class of service buffers, the eligible buffers having a TDT that is not later than a current time;
selecting a selected buffer from the eligible buffers, the selected buffer having a highest predetermined unit rate of the eligible buffers; and
transmitting a data unit from the selected buffer.

38. The system according to claim 37, wherein said network is an Asynchronous Transfer Mode Network.

39. The system according to claim 37, wherein said scheduler module further stores said predetermined unit rate of said each virtual connection in descending order.

40. The system according to claim 37, wherein said memory module further includes at least one service group interface having a plurality of classes of service.

41. The system according to claim 40, wherein said memory module further stores said plurality of data units in said plurality of class of service buffers within said at least one service group interface, each class of service buffer corresponding to one class of service of said plurality of classes of service.

42. The system according to claim 41, wherein said scheduler module further selects a service group interface from said at least one service group interface corresponding to one virtual connection of said plurality of virtual connections having said predetermined unit rate and selects one class of service buffer within said service group interface, said class of service buffer storing said data unit.

43. The system according to claim 42, wherein said scheduler module further determines each service group interface of said at least one service group interface having a TDT that is not later than the current time.

44. The system according to claim 42, wherein said scheduler module further determines each class of service buffer within said service group interface having a TDT that is not later than the current time.

45. The system according to claim 37, wherein said plurality of data units further comprises cells.

46. The system according to claim 37, further comprising:
a scheduler module for detecting an empty buffer of the plurality of class of service buffers, and for updating an empty TDT corresponding to said empty buffer based on a TDT of the selected buffer.

47. The system according to claim 46, wherein said scheduler module further updates said empty TDT to said TDT of said selected buffer, if said empty TDT is lower than said TDT of said selected buffer.

48. The system according to claim 46, wherein said scheduler module further maintains said empty TDT if said empty TDT is higher than said TDT of said selected buffer.

* * * * *